United States Patent [19]

Fukuhara

[11] Patent Number: 4,671,717
[45] Date of Patent: Jun. 9, 1987

[54] SCREW RECEIVER

[75] Inventor: Kunihiro Fukuhara, Yokohama, Japan

[73] Assignee: Nifco Inc., Tokyo, Japan

[21] Appl. No.: 870,000

[22] Filed: Jun. 3, 1986

[30] Foreign Application Priority Data

Sep. 27, 1985 [JP] Japan .................................. 60-212179

[51] Int. Cl.⁴ .............................................. F16B 37/00
[52] U.S. Cl. .................................... 411/182; 411/437; 411/913
[58] Field of Search .................. 411/21, 22, 23, 39, 411/42, 44, 45, 46, 47, 49, 50, 51, 55, 57, 61, 63, 64, 66, 67, 182, 437, 913

[56] References Cited

U.S. PATENT DOCUMENTS

| 1,062,992 | 5/1913 | Newhall et al. ...................... 411/61 |
| 2,149,719 | 3/1939 | Arnest ............................. 411/437 X |
| 4,284,378 | 8/1981 | Mizusawa ......................... 411/40 X |
| 4,407,618 | 10/1983 | Kimura ................................. 411/40 |
| 4,521,148 | 6/1985 | Tanaka ................................ 411/182 |

FOREIGN PATENT DOCUMENTS

| 912009 | 4/1946 | France ............................... 411/437 |
| 2457994 | 1/1981 | France .................................. 411/44 |
| 247636 | 12/1947 | Switzerland ........................ 411/64 |
| 402375 | 11/1933 | United Kingdom ................ 411/61 |
| 2101253 | 1/1983 | United Kingdom ................ 411/57 |

Primary Examiner—Thomas J. Holko
Attorney, Agent, or Firm—Trexler, Bushnell, Giangiorgi & Blackstone, Ltd.

[57] ABSTRACT

A screw receiver made of a synthetic resin to be fitted in a mounting hole formed in a panel to receive a setscrew when screwed comprises a hollow main body portion having a receiving space and open at one end, the main body portion having a flange provided at the end at which the receiving space is open, and a plurality of screw receiving portions each formed on one side surface in the longitudinal direction thereof and also having a raised portion on the other side surface, a screw receiving section being formed in the receiving space of the main body portion by inserting the screw receiving portions into the receiving space along the wall surfaces thereof through the open end of the main body portion.

5 Claims, 6 Drawing Figures

SCREW RECEIVER

FIELD OF THE INVENTION AND RELATED ART STATEMENT

This invention relates to a screw receiver made of a synthetic resin which is utilized when screw-securing a part to a metal or plastic panel of an automobile body, an electric appliance frame, etc.

When screw-securing a member to a metal panel, for instance, the screw can not be directly driven into the panel. Therefore, the panel is formed with a mounting hole in advance, and then the member to be mounted is secured by fitting a screw receiver made of a synthetic resin in the panel and then screwing a screw inserted through the member into the screw receiver.

Heretofore, screw receivers having various shapes have been utilized in various fields. The basic construction of such a screw receiver comprises a main body portion having a central screw hole or bore for receiving a screw screwed therein and a flange for restricting the extent of insertion of the main body portion into the mounting hole. In use, the body portion of the screw receiver is inserted through the mounting hole formed in a panel until the flange comes into contact with the panel. Then a member to be mounted is set on the top surface of the flange with a hole formed in the member aligned to a hole formed in the flange, and the screw is inserted through the hole in the member and screwed into the screw hole.

The screw used in this case is usually a tapping screw, and it is screwed through the screw hole of the screw receiver, which is not threaded, thereby securing the member. As the screw is screwed, the main body portion of the screw received is forced outwardly to increase its outer diameter. In this state, the detachment of the main body portion from the mounting hole is prevented, thus ensuring reliable securement of the member to the panel.

There are various types of the screw receiver to suit various uses. In some instances, the main body portion is split so that it can be readily expanded, and in other instances it has a blind screw hole so as to enhance the water-proof property. In either case, however, when a tapping screw is used with the screw receiver, the screwing of the screw into the main body portion and expansion thereof take place simultaneously, which poses significant structural problems.

More particularly, when a large diameter tapping screw is used to firmly secure the member, a large torque is exerted on the screw receiver. Therefore, the screw receiver is liable to be turned with the screw, so that the operability becomes poor. When a small diameter screw is used, on the other hand, although the operability can be improved, the depth of the engagement of the screw in the screw receiver is reduced, while the extent of expansion of the main body portion is also reduced, thus resulting in reduction of the stability of the securement.

Though one countermeasure would be to form a female thread in the screw hole, it is not so easy to form a screw hole having a female thread in the screw receiver, which is a synthetic resin molding. Particularly, this constitutes a drawback in mass production. From this standpoint, the prior art screw receiver has an unthreaded screw hole intended for use with a tapping screw. However, the tapping screw requires a large torque when it is screwed, so that it is liable to be turned with the screw driver.

OBJECT AND SUMMARY OF THE INVENTION

An object of the invention is to provide a synthetic resin screw receiver which permits satisfactory insertion of a screw and sufficient expansion of the main body portion.

The invention is based on extensive research and investigation conducted in view of the above problems inherent in the prior art screw receiver. The screw receiver according to the invention is molded from a synthetic resin and comprises a hollow main body portion having a receiving space and open at one end, the main body portion having a flange provided at the end at which the receiving space is open, and a plurality of screw receiving portions each formed on one side surface in the longitudinal direction thereof and also having a raised portion on the other side surface, a screw receiving section being formed in the receiving space of the main body portion by inserting the screw receiving portions into the receiving space along the wall surfaces thereof through the open end of the main body portion.

In accordance with the invention, in view of the above problem in the prior art screw receiver, i.e., simultaneous occurrence of the screwing of the screw and expansion, a substantial female thread is formed in the interior of the main body portion to be expanded by inserting screw receiving portions with a thread formed on one side into the main body portion, and the screw is screwed with the threads of the screw receiving portions as a guide. Thus, the screw can be inserted satisfactorily without the screwing torque that is necessary when screwing a tapping screw in the prior art screw receiver. In addition, the screw receiving portions serve as a wedge to cause increase of the outer diameter of the main body portion.

The screw receiving portions can be readily formed by forming them independently of the main body portion. Further, with the insertion of the screw receiving portions a sufficient thickness of the main body portion for expansion can be ensured. That is, it is possible to substantially reduce the thickness of the main body portion. Thus, it is possible to provide a main body portion having rich elasticity and capable of being sufficiently expanded when the screw is screwed.

In the use of the aforesaid screw receiver according to the invention, in which the main body portion and screw receiving portions can be formed independently, the screw receiving portions are inserted into the receiving space of the main body portion from the open end thereof along the inner wall surface thereof, and in this state, the screw receiver is inserted through a mounting hole formed in a metal or like panel until the flange comes into contact with the panel. Thereafter, a member to be mounted is set on the top surface of the flange of the screw receiver with a hole formed in the member aligned to the open end, i.e. hole in the flange, and then a setscrew is passed through the hole in the member and screwed into the screw receiver from the open end thereof along the threads of the screw receiving portions received in the receiving space, whereby the member is secured to the panel.

The setscrew is guided by the threads of the screw receiving portions as it is screwed, so that it can be readily screwed into the interior of the main body portion. As the screw is inserted, the screw receiving portions are outwardly urged so that the raised portions formed on the other side urge and cause expansion of the wall of the main body portion. The main body portion thus is firmly engaged with the edge of the mounting hole, thus preventing the detachment of the screw receiver from the mounting hole.

BRIEF DESCRIPTION OF THE DRAWINGS

The above and other objects and features of the invention will become more apparent from the detailed description of an embodiment thereof with reference to the accompanying drawings, in which.

DETAILED DESCRIPTION OF THE PREFERRED EMBODIMENT

Figure 1:
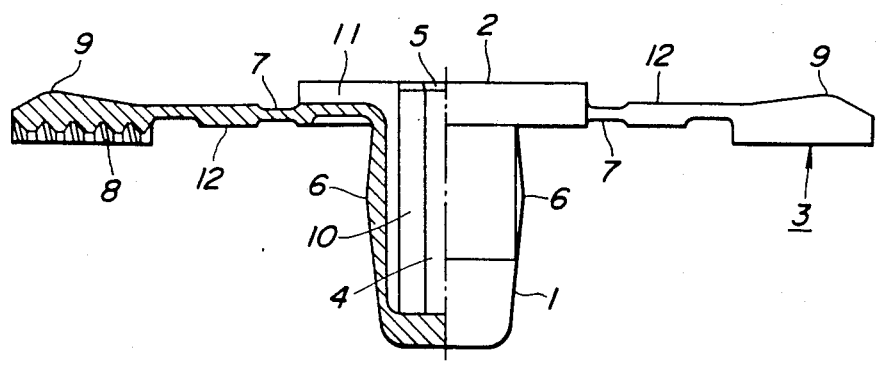
FIG. 1 is a front view, with the left half in section, showing an embodiment of the screw receiver according to the invention.
Figure 2:
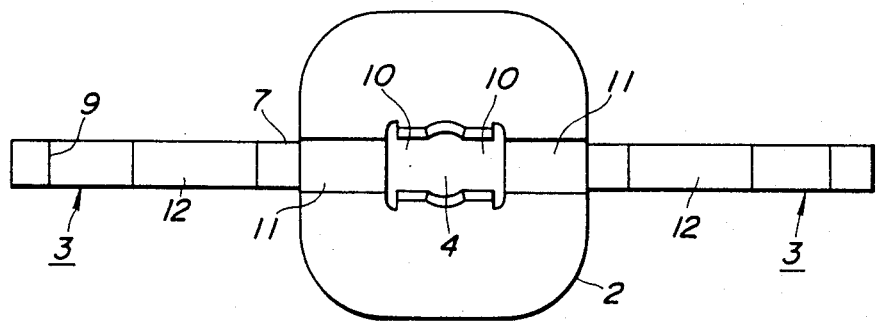
FIG. 2 is a plan view showing the screw receiver shown in FIG. 1.
Figure 3:
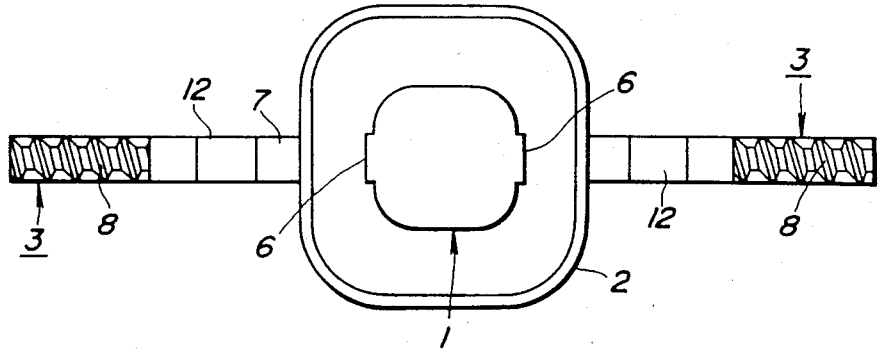
FIG. 3 is a bottom view showing the screw receiver shown in FIG. 1.
Figure 4:
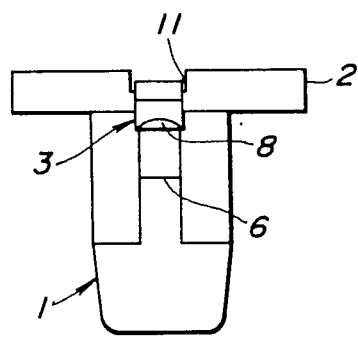
FIG.4 is a side view showing the screw receiver shown in FIG. 1.

FIGS. 1 to 4 show a screw receiver according to the invention. This screw receiver is obtained by injection molding a synthetic resin. It has a main body portion 1, a flange 2 provided at one end of the main body portion 1 and screw receiving portions 3 projecting from the edge of the flange in opposite directions.

The main body portion 1 has a substantially square outer shape. It is hollow and has a receiving space 4. The receiving space 4 is a blind space open at the opening 5. The main body portion 1 has raised portions 6 formed on the central portion of the opposite side outer surfaces.

The flange 2 serves to prevent the main body portion 1 from being taken out to the opposite side when it is inserted through a mounting hole a formed in a panel A. Also, it serves to clamp the panel portion surrounding the mounting hole in co-operation with the head of a screw inserted through a mounting hole of a panel. In this embodiment, the flange 2 has a square shape.

In the use of the screw receiver, the screw receiving portions 3 are inserted into the receiving space 4 of the main body portion 1. The screw receiving portions 3 extend symmetrically in opposite directions from the opposite sides of the edge of the flange via hinge portions 7 having a reduced thickness.

The screw receiving portions 3 each have an elongate thick block-like shape. They each have a thread 8 constituted by a plurality of arcuate grooves formed in a smooth straight surface in a row extending in the longitudinal direction. The opposite side of the screw receiving portion 3 from the thread 8 is formed with a raised portion 9 having a convex or hill-like sectional profile.

The screw receiving portions 3 are received in the receiving space 4 of the main body portion 1, and a screw B can be screwed into the screw receiving portions 3 in this state. The opposite wall surfaces of the main body portion 1 are formed with elongate recesses 10 facing each other for receiving the screw receiving portions 3. Further, the top surface of the flange 2 is formed with grooves 11 which terminate in one end of the elongate recesses 10.

The illustrated embodiment of the screw receiver according to the invention is formed as a one-piece molding having outwardly projecting screw receiving portions 3 from a thermoplastic synthetic resin such as nylon. In use, the ends of the screw receiving portions 3 are inserted into the receiving space 4 of the main body portion by folding the hinge portions 7. In this state, an arm portion 12 which connects each hinge portion 7 is received in the corresponding groove 11 formed in the top surface of the flange 2, and the rest of each screw receiving portion is received in the corresponding recess 10 formed in each side wall surface of the receiving space.

Figure 5:
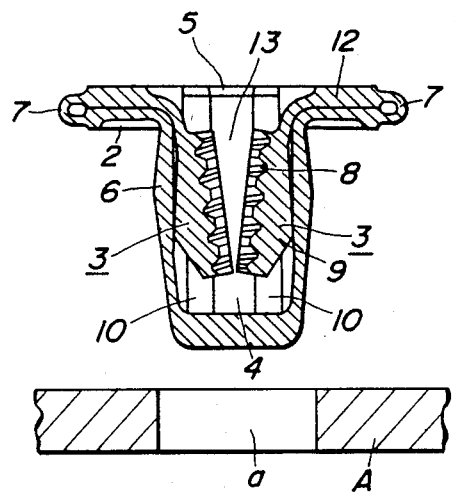
FIG. 5 is an axial sectional view showing the screw receiver with screw receiving portions accommodated in a receiving space of a main portion.

FIG. 5 shows the screw receiver with the screw receiving portions 3 inserted in the receiving space 4 of the main body portion. The screw receiving portions 3 are received such that their threaded surfaces face each other. More specifically, the two screw receiving portions 3 inserted from the opposite sides face each other, while their raised portions 9 formed on the other side are in contact with the bottom of the recesses 10. Thus, the screw receiving portions 3 define a screw receiving section 13 having a V-shaped sectional profile in the receiving space 4.

In use, the main body portion 1 with the screw receiving portions 3 received therein is inserted through the mounting hole a formed in the panel A until the lower surface of the flange 2 is in contact with the panel portion surrounding the hole a. In this state, the screw receiver is temporarily set in the panel A with the raised portions 6 formed on the outer surface engaged with the edge of the hole.

A member to be mounted, i.e. a panel C, is then mounted by setting the panel C on the upper surface of the flange 2 with the mounting hole aligned thereto, then inserting the setscrew B through the mounting hole and then screwing it into the screw receiving section 13 constituted by the screw receiving portions 3.

Figure 6:
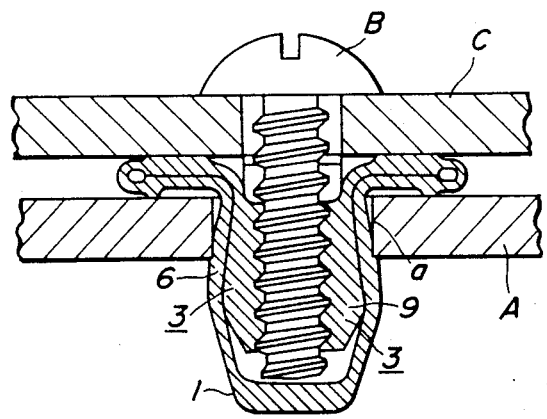
FIG. 6 is an axial sectional view showing the screw receiver in use.

FIG. 6 shows the screw receiver after the panel A has been secured to the panel C by screwing and tightening the screw B. When the setscrew B is screwed using a screw driver, for instance, it proceeds deeply into the screw receiving section 13 with the threads 8 of the screw receiving portions as a guide. At this time, the screw expands the space defined in the screw receiving section to outwardly displace the screw receiving portions so as to cause outward expansion of the wall of the main body portion 1. The raised portions 6 thus come to engage with the edge of the mounting hole a strongly.

At this time, the screw B is urged at the head while it is turned by the screw driver. Thus, it is screwed while pushing the screw receiving portions 3 into the receiving space 4. Thus, it prevents the screw receiving portions from popping out. Meanwhile, when the screw has been screwed to a certain extent, it now urges the wall of the main body portion, thus causing the raised portions 9 to wedge into the inner surface. In this state, the screw receiving portions will not be displaced toward the open end of the main body. That is, when the screw is screwed, the screw receiving portions 3 function as a wedge to prevent the popping-out of the setscrew B and also prevent the detachment of the main body portion from the mounting hole, thus ensuring reliable mounting of a mounting member on the panel.

The above embodiment of the screw receiver is given for the purpose of illustration only, and it can be modified variously. For example, it is possible to provide three or four screw receiving portions instead of the two screw receiving portions such that they are radially spaced apart. Further, while in the above embodiment the screw receiving portions are united to the edge of the flange 2 of the main body portion 1 via the hinges, it is possible to provide the screw receiving portions separately. In such a case, the grooves on the top surface of the flange are unnecessary.

While the embodiment illustrating the invention has been described above, since the screw receiving portions for substantially receiving the screw and the main body portion expanded in the mounting hole of the panel are structurally separate from one another, the wall of the main body portion can be readily expanded with the screwing of the screw, it is possible to obtain sufficient expansion, and hence strong engagement force. Also, since the screw receiving portions are formed with threads to guide the screwing of the screw, the screw can be far more readily screwed than can the prior art type tapping screw. Further, since the screw is screwed in the preformed threads, the threads will not be broken by the tightening and releasing of the screw, so that the screw receiver can be used repeatedly.

Further, since with the screw receiver according to the invention the screw receiving portions are independent of the expansible wall of the main body portion, they are not forced to undergo any deformation such as elongation when receiving the screw. Therefore, it is possible to sufficiently increase the thickness to increase the urging force for expansion. Further, since the wall of the main body portion is independent of the screw receiving portions, it is possible to reduce the thickness and increase the extent of expansion. Thus, it is possible to improve the operability and obtain a stable and high engagement force.

Further, with the screw receiver according to the invention the screw receiving portions having the threads are formed on the outer side of the main body portion, excellent moldability can be obtained, which is suited for mass production, and also highly accurate threads can be formed. Particularly, since the main body portion is in the form of a sack so that the receiving space 4 is blind, it is very cumbersome in manufacture to form an internal screw receiving section of a female thread type. According to the invention, however, there is no need of forming any female thread at the time of the molding, which is very advantageous for manufacture.

In the above embodiment the inner wall surface defining the receiving space 4 is formed with the recesses 10 to receive the screw receiving portions. These recesses serve to prevent rotation of the screw receiving portions 3 when screwing the screw. The same effects may be obtained by providing a receiving space having a non-circular sectional profile instead of providing the recesses.

Particularly, in the illustrated embodiment the inner wall surface of the receiving space 4 is formed with the two recesses 10 which have a depth suited to the thickness of the screw receiving portions 3 so that the surfaces formed with the threads 8 are flush with the inner wall surface of the receiving space 4. This is an example where a portion of the screw is made to engage a portion of the inner wall surface directly in addition to the screwing of the screw with the threads 8 of the screw receiving portions as a guide, thus increasing the clamping force of the screw, so that it serves as effective means depending on the place where the screw receiver according to the invention is used.

What is claimed is:

1. A screw receiver made of a synthetic resin for mounting in a hole in a panel and adapted to receive a screw threaded thereinto, comprising a hollow main body portion having a receiving space and having an open end, said main body portion having a flange at said open end, and a plurality of screw receiving portions each secured to said flange and extending outwardly transversely away from said body portion, each of said screw receiving portions having an upper surface and a lower surface, each of said lower surfaces having a laterally ribbed screw receiving portion and each of said upper surfaces having a raised portion, said screw receiving portions being foldable into said body receiving space with said laterally ribbed screw receiving portions oriented inwardly, said screw receiving portions threby jointly forming a screw receiving section, said raised portions being oriented outwardly to engage and expand said body when a screw is threaded into said screw receiving section.

2. The screw receiver according to claim 1, wherein said screw receiving portions are foldably united to said main body portion via hinge portions having a reduced thickness.

3. The screw receiver according to claim 1, wherein said screw receiving portions extend from the edge of said flange of said main body portion.

4. Th screw receiver according to claim 1, wherein the inner wall surface of said main body portion is formed with recesses extending longitudinally from said open end for receiving said screw receiving portions.

5. The screw receiver according to claim 1, wherein said screw receiving portions constitute a pair.

* * * * *